United States Patent [19]

Thom et al.

[11] Patent Number: 5,609,381
[45] Date of Patent: Mar. 11, 1997

[54] PARALLEL GRIPPER HAVING A FORCE MEASURING ARRANGEMENT

[75] Inventors: Heinz Thom; Alfred Neumann; Wolfgang Johansen; Peter Zier, all of Berlin, Germany

[73] Assignee: Licentia Patent-Verwaltungs-GmbH, Frankfurt am Main, Germany

[21] Appl. No.: 413,856

[22] Filed: Mar. 28, 1995

[30] Foreign Application Priority Data

Mar. 28, 1994 [DE] Germany ................. 44 11 319.6

[51] Int. Cl.⁶ ........................ B25J 15/02; B25J 19/02
[52] U.S. Cl. .............. 294/119.1; 294/907; 901/34; 901/38; 901/46
[58] Field of Search ........................ 294/86.4, 99.1, 294/103.1, 119.1, 907; 414/729, 730, 751; 901/31–34, 36–39, 46

[56] References Cited

U.S. PATENT DOCUMENTS

| | | |
|---|---|---|
| 4,132,318 | 1/1979 | Wang et al. |
| 4,456,293 | 6/1984 | Panissidi ............... 294/907 X |
| 4,478,089 | 10/1984 | Aviles et al. ........... 294/907 X |
| 4,579,380 | 4/1986 | Zarmesky et al. ........ 294/119.1 |
| 4,653,793 | 3/1987 | Guinot et al. ........... 294/119.1 X |
| 4,699,414 | 10/1987 | Jones ................... 294/119.1 |
| 4,819,978 | 4/1989 | Scheinman et al. ........ 294/119.1 |
| 4,872,803 | 10/1989 | Asakawa ............... 294/119.1 X |

FOREIGN PATENT DOCUMENTS

| | | |
|---|---|---|
| 3606874 | 9/1987 | Germany. |
| 3905656 | 12/1989 | Germany. |
| 3910801 | 10/1990 | Germany. |

*Primary Examiner*—Johnny D. Cherry
*Attorney, Agent, or Firm*—Spencer & Frank

[57] ABSTRACT

A parallel gripper includes an electric motor; a threaded spindle connected to the motor to be driven thereby about a longitudinal spindle axis; a spindle nut threadedly mounted on the spindle for longitudinal travel therealong upon rotation of the spindle; a support block affixed to the nut; an arrangement for preventing a rotation of the spindle nut about the spindle axis; a mounting plate for accommodating a gripper jaw thereon; and a first, a second, a third and a fourth web coupling the mounting plate to the support block. The first and second webs are parallel to one another and are spaced in a direction parallel to the spindle axis; and also, the third and fourth webs are parallel to one another and are spaced in a direction parallel to the spindle axis. Further, strain gauges are mounted on the webs for emitting signals representing a bending deformation the webs undergo in response to a reaction force generated by a gripping force of the gripper.

7 Claims, 3 Drawing Sheets

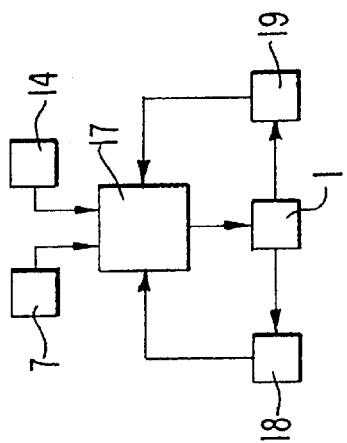
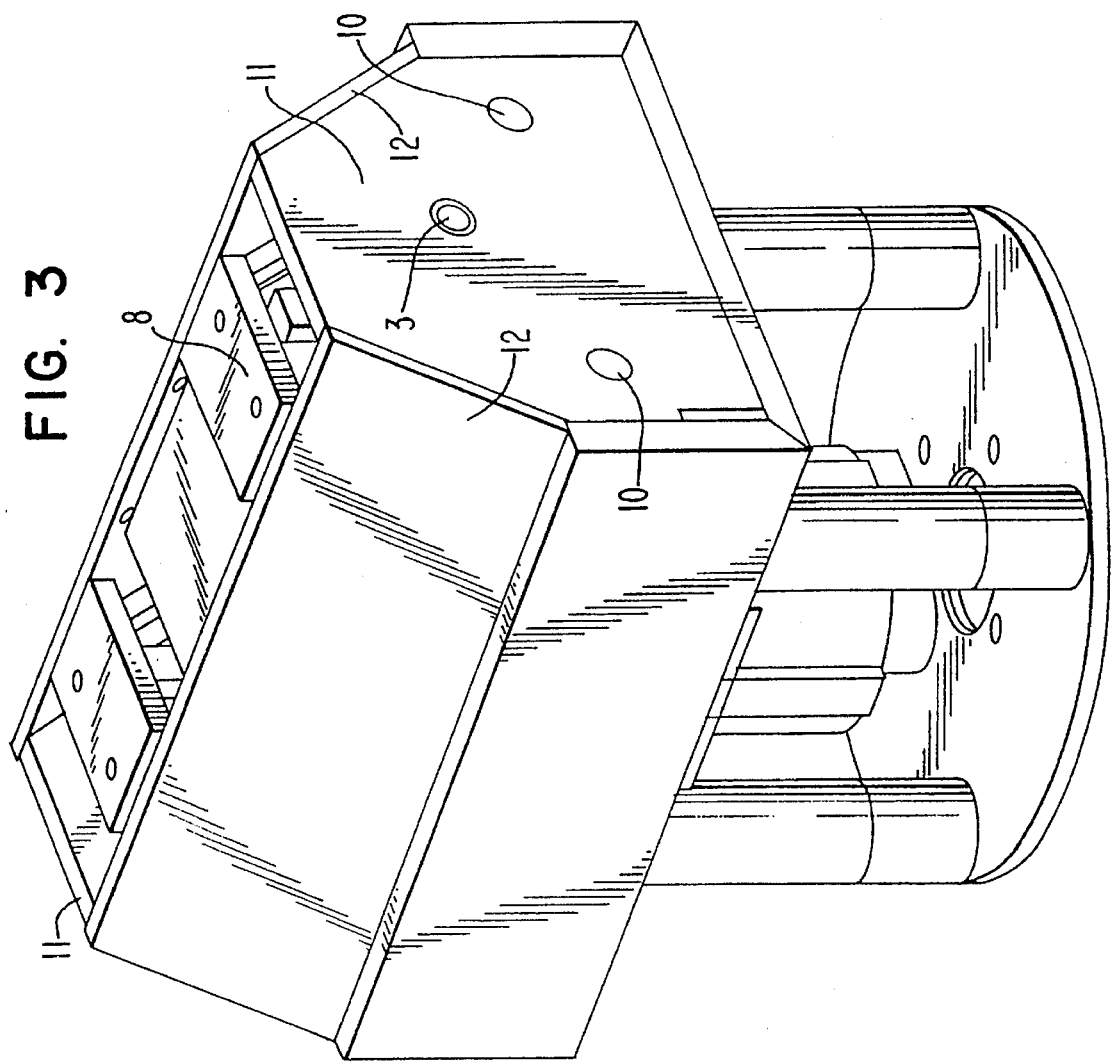

PARALLEL GRIPPER HAVING A FORCE MEASURING ARRANGEMENT

CROSS REFERENCE TO RELATED APPLICATION

This application claims the priority of German Application No. P 44 11 319.6 filed Mar. 28, 1994, which is incorporated herein by reference.

BACKGROUND OF THE INVENTION

This invention relates to a parallel gripper which includes two gripping jaws moved simultaneously in opposite directions toward or away from one another by an electric motor, preferably a stepping motor via a common worm wheel or separate worm wheels of a worm gear drive. The shaft of each worm wheel is extended to form a spindle on which at least one spindle nut is threadedly mounted to travel parallel to the spindle axis as the spindle is rotated. A support is affixed to the spindle nut and prevented from rotation about the spindle axis. In case two supports are provided, they move on each side of the worm wheel on the spindle in opposite directions. Each gripping jaw is carried by a respective support. Further, for each gripping jaw a force-measuring device is associated, having strain gauges for detecting deformations.

German Offenlegungsschrift (application published without examination) 36 06 874 discloses a gripper having gripping jaws which, for adjusting the gripping opening, are shifted by a motor with the intermediary of a worm screw drive including threaded spindles. The motor, particularly a stepping motor, is supported against a biasing force for displacement parallel to the length direction of the worm screw. It is a disadvantage of this arrangement that an accurate measurement of the gripping force at each gripping jaw and an indication of the gripping position are not possible.

Further, German Offenlegungsschrift 39 05 656 discloses a parallel gripper having a spindle drive and presence monitoring means in which, with the aid of a special switching device connected with the spindle nut, a switching signal is emitted if, during the gripping process, the switch is actuated by a body and by the pressure applied thereby to the jaws. The switch is coupled to the motor control which generates control signals for the motor. In this prior art construction too, a measurement and regulation of the gripping force is not possible.

It is further known, such as disclosed, for example, in German Offenlegungsschrift 39 10 801 to indirectly determine the gripping force by means of the motor current. Such a method, however, is inaccurate and also, it cannot determine the gripping force at the individual jaws.

Further, U.S. Pat. No. 4,132,318 discloses a manipulating system including a two-jaw gripper wherein each jaw is coupled with a gripping jaw drive by means of a six-component force-and-torque system. Both measuring systems are asymmetrical; forces and torques are determined with the aid of measured deformations. Such a gripper is unstable; a reliable, positive gripping cannot be effected because the jaws are pivotal in all directions. Further, no overload safety device appears to be provided or is feasible.

SUMMARY OF THE INVENTION

It is an object of the invention to provide an improved parallel gripper of the above-outlined type with which a direct measurement of the gripping force at the individual jaws is safely and reliably ensured with simple technical means.

This object and others to become apparent as the specification progresses, are accomplished by the invention, according to which, briefly stated, the parallel gripper includes an electric motor; a threaded spindle connected to the motor to be driven thereby about a longitudinal spindle axis; a spindle nut threadedly mounted on the spindle for longitudinal travel therealong upon rotation of the spindle; a support block affixed to the nut; an arrangement for preventing a rotation of the spindle nut about the spindle axis; a mounting plate for accommodating a gripper jaw thereon; and a first, a second, a third and a fourth web coupling the mounting plate to the support block. The first and second webs are parallel to one another and are spaced in a direction parallel to the spindle axis; and also, the third and fourth webs are parallel to one another and are spaced in a direction parallel to the spindle axis. Further, strain gauges are mounted on the webs for emitting signals representing a bending deformation the webs undergo in response to a reaction force generated by a gripping force of the gripper.

It is an advantage of the invention that the particularly structured jaw support assembly allows a direct and accurate measurement of the gripping force at each jaw. Deformations of the measuring webs occur only in the direction of jaw motion, and the jaws cannot tilt away from the grasped body.

According to a further feature of the invention, a control device is provided to which signals of the strain gauges are applied and which, according to a program, may control the drive motor to thus control the course of the gripping force. The gripping distance, that is, the size of the body to be handled, may be determined and furthermore the position of the body may be ascertained for clamping to fixed components.

BRIEF DESCRIPTION OF THE DRAWING

FIG. 3 is a perspective view of the preferred embodiment, shown with a housing.

FIG. 4 is a block diagram showing a control for the gripper according to the invention.

DESCRIPTION OF THE PREFERRED EMBODIMENT

Figure 2A:
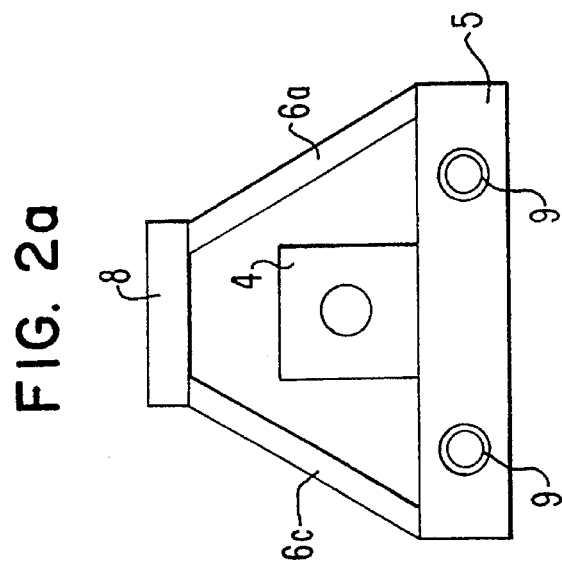
FIG. 2a is a schematic elevational view of a component of FIG. 2, viewed in the direction arrow IIa.
Figure 1:
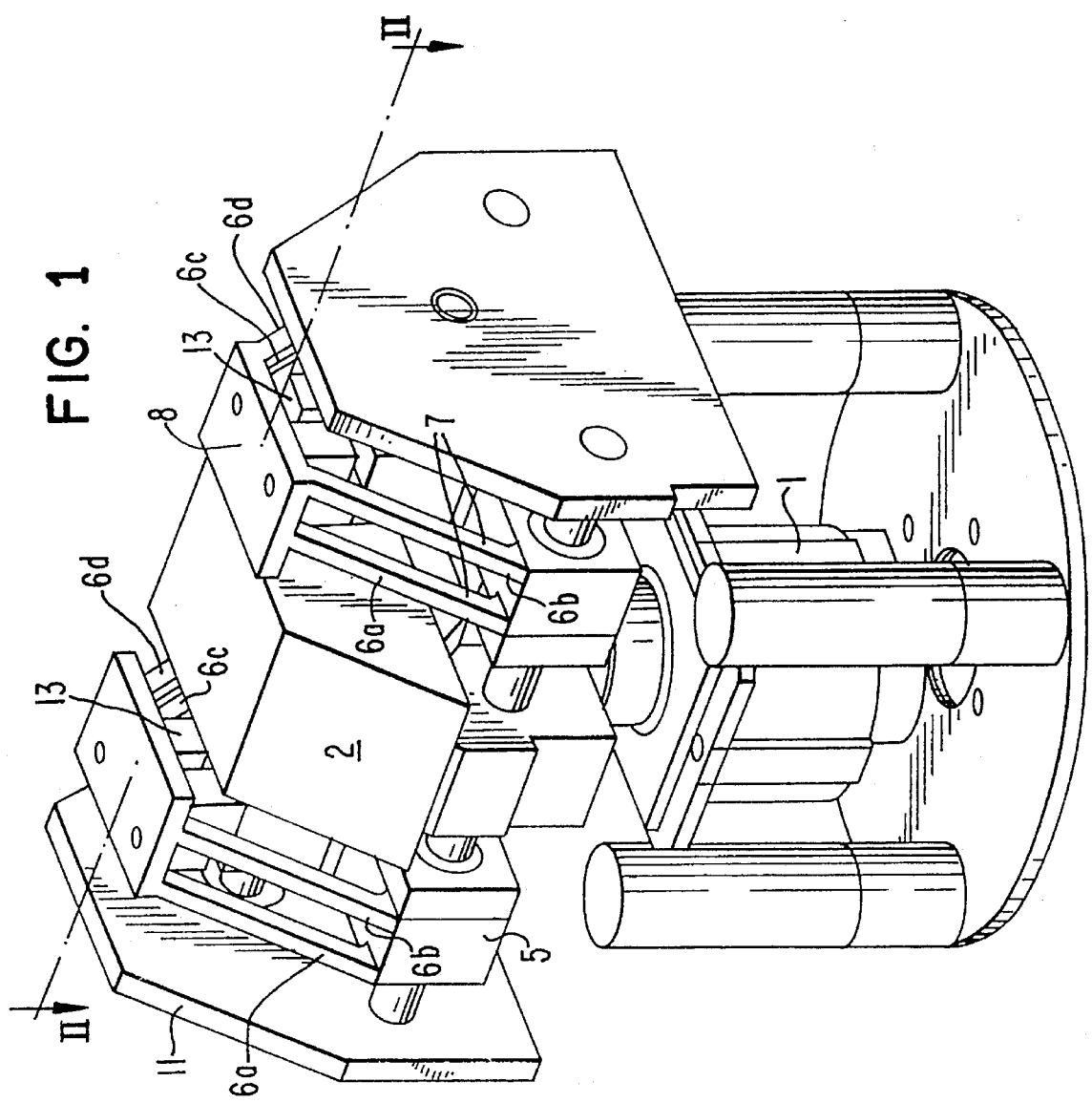
FIG. 1 is a perspective view of a preferred embodiment of the invention, shown without a housing.
Figure 2:
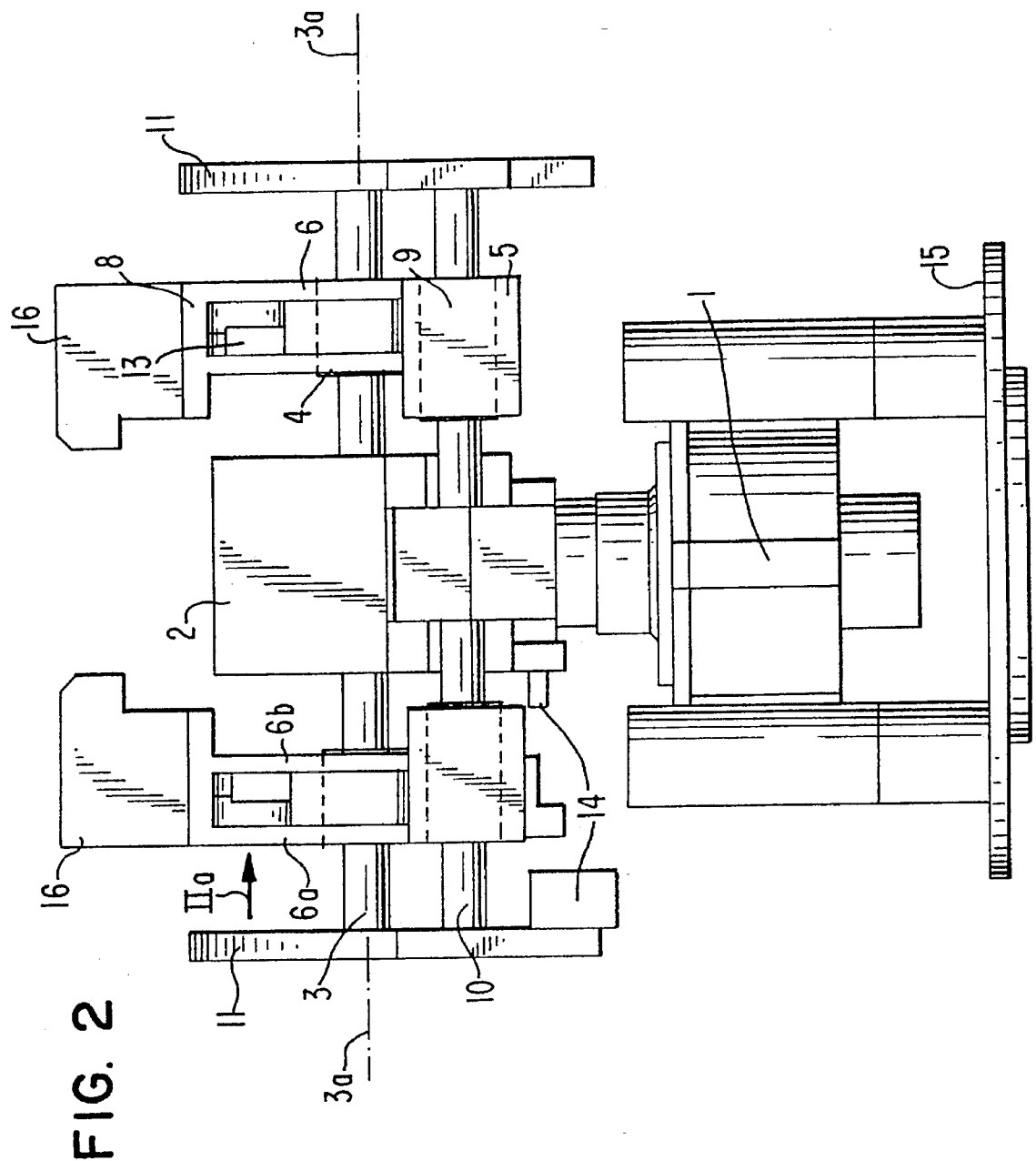
FIG. 2 is a sectional view taken along line II—II of FIG. 1.

Turning to FIGS. 1, 2, 2a and 3, an electric stepping motor 1, mounted on a base plate 15, rotates a threaded spindle 3 via a worm gear drive accommodated in a gear housing 2. Such a drive mechanism is conventional and is therefore not described in more detail. The spindle 3—which has a spindle axis 3a and two spindle portions projecting in opposite directions from the gear housing 2—is supported in frame plates 11. On each spindle portion of the spindle 3 a spindle nut 4 is mounted for travel along the spindle axis in simultaneously opposite directions relative to one another. Each spindle nut 4 is fixedly mounted on a respective support block 5 having, on opposite sides of the spindle nut 4, two spaced guide sleeves 9 through which pass respective stationary guide bars 10 supported on the frame plates 11 and the gear housing 2. The housing 2 thus also has a supporting function in addition to serving as a protection and cover.

The support block 5 is connected by means of four webs 6a, 6b, 6c and 6d with a jaw mounting plate 8 which accommodates a respective gripping jaw 16. The webs 6a and 6b are situated on one side of the spindle 3; they extend parallel to one another and are spaced from one another in a direction parallel to the spindle 3. The webs 6c and 6d are situated on an opposite side of the spindle 3; similarly to webs 6a and 6b, they extend parallel to one another and are spaced from one another in direction parallel to the spindle 3. Thus, the webs 6a and 6c are, similarly to the webs 6b and 6d, disposed on opposite sides of the spindle nut 4 and are spaced from one another in a direction perpendicular to the spindle axis 3a.

On each web 6a–6d there is provided a strain gauge 7, formed of strain gauge strips. The dimensions of the webs are less in the direction of gripper motion than in a direction perpendicular thereto, so that an intended bending occurs, according to the invention, only in the gripping direction, that is, parallel to the spindle axis. The two webs spaced in the direction of gripper motion on either side of the spindle nut 4 provide that when a force is applied, the jaw mounting plate 8 does not tilt away but is shifted approximately parallel to itself.

To prevent an excessive stress on the webs 6a–6d and the strain gauges 7, an overload protecting device 13 is provided which includes settable abutments secured to the jaw mounting plate 8 and the support block 5.

Further, inductive transmitters 14 are provided which function as limit switches for indicating the open condition of the gripper. The limit switches 14 serve simultaneously for an additional overload protection and for synchronization.

Also referring to FIG. 4, as a body is clamped by the gripper jaws 16, the reaction force causes a bending deformation of the webs 6a–6d. This, in turn, causes the strain gauges 7 to emit measuring signals by the force applied to the respective jaw 16 and the signals are applied to a control device 17. The control device 17 also receives signals from a conventional rpm detector 18 and a conventional angular position detector 19, both connected operatively to the output shaft (not shown) of the motor 1. These, if a stepping motor is used, detect and count the steps performed by the motor.

Based on the above signals, it is feasible to conventionally perform, for example, the following functions:

to program the step length;

to determine the gripping distance;

to program the gripping force, for example, for an assembly with minimal joining forces; and to determine the position of the body from fixed components.

In case a separate drive is associated with each jaw, the gripping motion may be performed asymmetrically so that even inaccurately arranged components may be grasped without the need for additional gripper motion.

While two movable gripper jaws are described, the invention may be practiced in a gripper which has a single movable gripping jaw cooperating, for example, with a fixed counterjaw carried by the gripper frame.

It will be understood that the above description of the present invention is susceptible to various modifications, changes and adaptations, and the same are intended to be comprehended within the meaning and range of equivalents of the appended claims.

What is claimed is:

1. A parallel gripper comprising
   (a) an electric motor;
   (b) a threaded spindle connected to said motor to be driven thereby about a longitudinal spindle axis;
   (c) a spindle nut threadedly mounted on said spindle for longitudinal travel therealong upon rotation of said spindle;
   (d) a support block affixed to said nut;
   (e) means for preventing a rotation of said spindle nut about said spindle axis;
   (f) a mounting plate for accommodating a gripper jaw thereon;
   (g) a first, a second, a third and a fourth web coupling said mounting plate to said support block; said first and second webs being parallel to one another and being spaced in a direction parallel to the spindle axis; said third and fourth webs being parallel to one another and being spaced in a direction parallel to the spindle axis; and
   (h) deformation signalling means mounted on said webs for emitting signals representing a bending deformation said webs undergo in response to a reaction force generated by a gripping force of the gripper.

2. The parallel gripper as defined in claim 1, wherein said first and third webs are situated on opposite sides of said spindle nut and are spaced from one another in a direction perpendicular to the spindle axis and further wherein said second and fourth webs are situated on opposite sides of said spindle axis and are spaced from one another in a direction perpendicular to the spindle axis.

3. The parallel gripper as defined in claim 1, wherein each said web has a first dimension measured parallel to said spindle axis and a second dimension measured perpendicular to said spindle axis; said first dimension being less than said second dimension for allowing a bending deformation of said webs substantially solely in a direction parallel to said spindle axis.

4. The parallel gripper as defined in claim 1, further comprising an overload protection device disposed between said spindle nut and said mounting plate for preventing an excessive deformation of said webs.

5. The parallel gripper as defined in claim 1, further comprising
   (j) sensor means for emitting signals representing an rpm of said electric motor and an angular position of said spindle; and
   (k) a control device connected to said deformation signalling means, to said sensor means and to said electric motor for evaluating the signals from said deformation signalling means and the signals from said sensor means and for controlling the electric motor as a function of said signals.

6. The parallel gripper as defined in claim 1, further comprising a mounting frame; said spindle being rotatably supported in said mounting frame.

7. A parallel gripper comprising
   (a) an electric motor;
   (b) first and second threaded spindle portions connected to said motor to be driven thereby about a longitudinal spindle axis;
   (c) two spindle nuts threadedly mounted on respective said spindle portions for longitudinal travel therealong upon rotation of said spindle portions;

(d) a separate support block affixed to each said spindle nut for receiving a gripper jaw thereon;

(e) means for preventing a rotation of each said spindle nut about a respective said spindle portion;

(f) two mounting plates for accommodating a respective gripper jaw thereon;

(g) a first, a second, a third and a fourth web coupling each said mounting plate to a respective said support block; said first and second webs being parallel to one another and being spaced in a direction parallel to the spindle axis; said third and fourth webs being parallel to one another and being spaced in a direction parallel to the spindle axis; and (h) deformation signalling means mounted on said webs for emitting signals representing a bending deformation said webs undergo in response to a reaction force generated by a gripping force of the gripper.

* * * * *